April 19, 1949. C. E. GROSSER ET AL 2,467,739
VARIABLE SPEED POWER TRANSMISSION DEVICE
Filed Nov. 9, 1945 5 Sheets-Sheet 1

Inventors:
Christian E. Grosser
and Wilbert M. Gilman
By Pennington and White
Attorneys.

April 19, 1949.   C. E. GROSSER ET AL   2,467,739
VARIABLE SPEED POWER TRANSMISSION DEVICE
Filed Nov. 9, 1945   5 Sheets-Sheet 5

Inventors:
Christian E. Grosser
and Wilbert M. Gilman
By
Attorneys.

Patented Apr. 19, 1949

2,467,739

UNITED STATES PATENT OFFICE 2,467,739

VARIABLE-SPEED POWER TRANSMISSION DEVICE

Christian E. Grosser, Warwick, R. I., and Wilbert M. Gilman, Wellesley Hills, Mass., assignors, by mesne assignments, to Cread Engineering and Research Company, Cranston, R. I., a corporation of Rhode Island Application November 9, 1945, Serial No. 627,582

12 Claims. (Cl. 74—190.5)

1

This invention relates to a variable-speed torque-responsive transmission of general application and particularly adapted for use in vehicles such as automobiles, trucks, tractors, motorcycles or in a stationary power unit.

One object of the present invention is to provide a transmission of the type indicated which is automatically adjustable to vary the speed of a driven element in inverse ratio to its torque resistance to maintain a substantially constant power output at the source.

Another object is to provide a transmission of the type indicated embodying friction driving means which are automatically adjustable by relative movement of the driving and driven elements to vary the speed of the driven member.

Another object is to provide a transmission of the type indicated in which one of the friction members is automatically adjustable in response to its resistance to turning to vary its speed in inverse ratio to its torque.

Another object is to provide a transmission of the type indicated for use between a prime-mover and the driven wheels of a vehicle to prevent stalling of the prime-mover due to overload.

Another object is to provide a transmission of the type indicated which is simple in construction, efficient in operation, and durable in use over long periods of time without requiring repair or replacement of the parts.

Further objects of the invention are set forth in the following specification which describes a preferred form of construction of the device, by way of example, as illustrated by the accompanying drawings.

2 illustrating the gear-pump which supplies lubrication to the bearings of the device while connecting the two driving disk shafts for rotation in opposite directions.

In general, the present improved variable-speed transmission comprises a power-input shaft adapted for connection with a prime-mover such as a motor; a pair of driving disks driven from said shaft and engaging the opposite faces of a driven disk; said driven disk being connected by gearing to a power-output shaft and adapted for automatic adjustment relative to the driving disks under the influence of torque resistance on the power-output or driven shaft to vary the speed of said driven shaft while maintaining a substantially constant power-output at the source.

Figure 1:
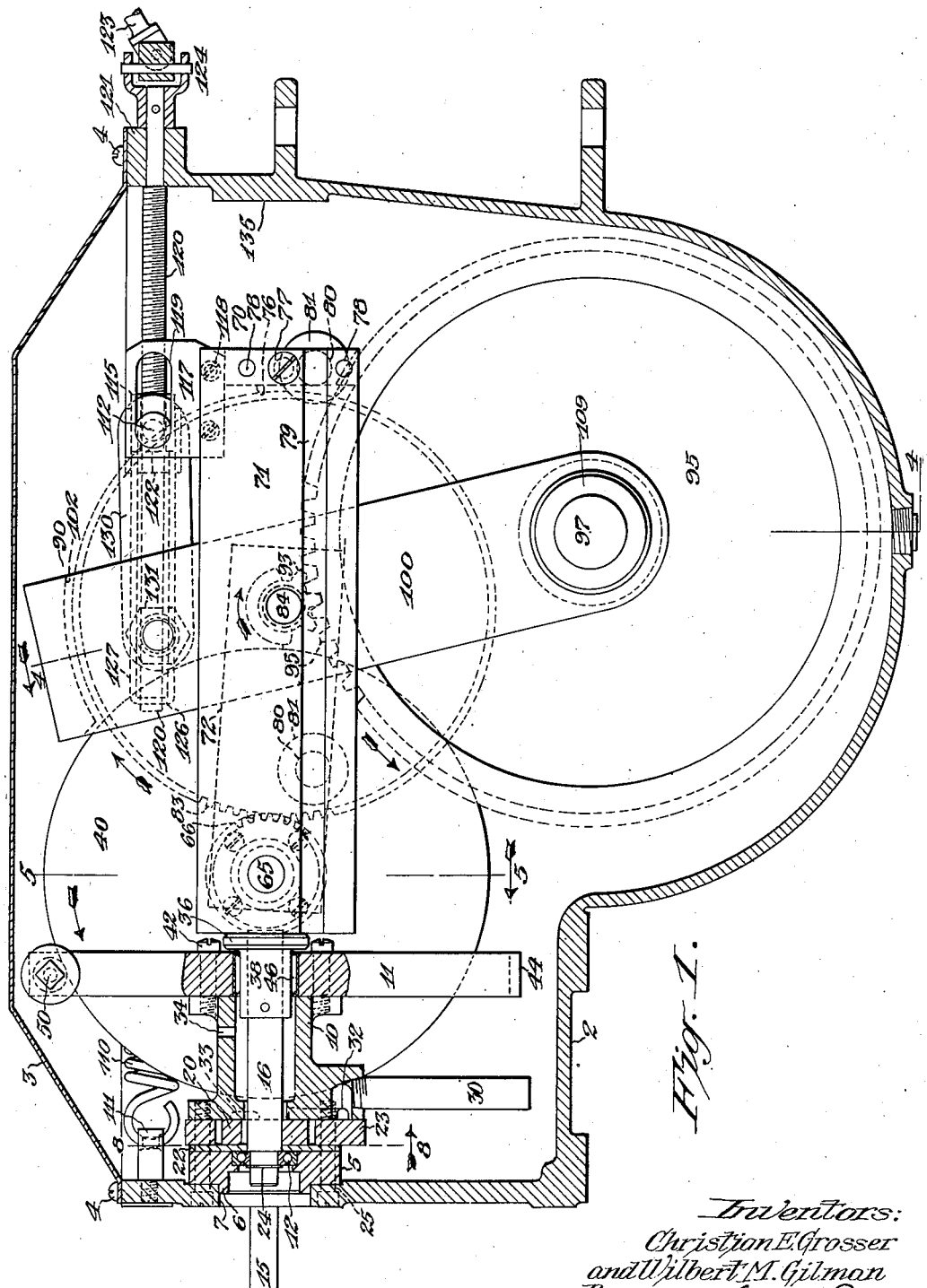
Fig. 1 is a side elevational view of the transmission, part-sectional on line 1—1 of Fig. 3.
Figure 6:
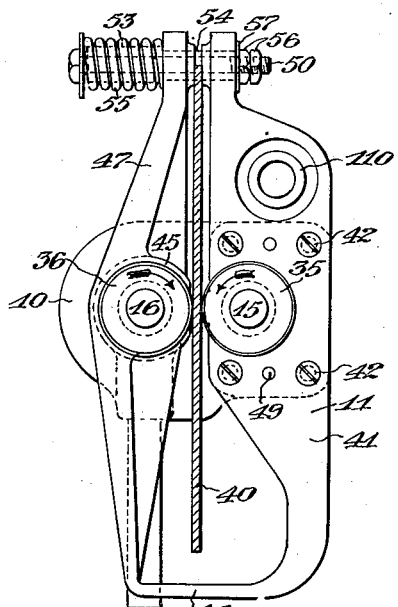
Fig. 6 is an elevational view showing the driven disk in section and illustrating the means for maintaining peripheral contact of the pair of driving disks therewith.
Figure 8:
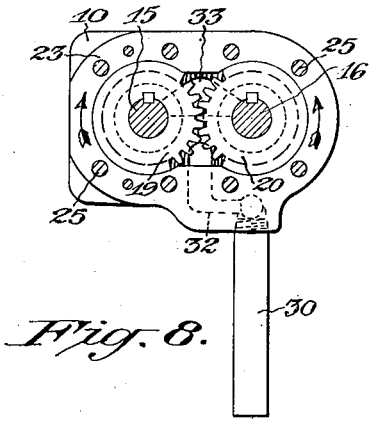
Fig. 8 is a view taken on line 8—8 of Fig. 1.

As herein shown, the gearing and other mechanism of the transmission is enclosed in an oiltight casing 2, closed at the top by a sheet-metal cover 3 fastened thereto at 4. Mounted at one end of the casing 2 is a composite dual bearing comprising a main housing 5 flanged at 6 to enter a substantially oval opening 7 in the wall of the casing 2 and connected to a supplementary housing 10 which supports a yoke-member 11, shown in detail in Fig. 6, to be later described. The main housing 5 is bored on two laterally-spaced centers to provide for mounting twin ball-bearings, indicated generally at 12 in Figs. 1 and 2, for a pair of shafts 15 and 16. The shaft 15 may be constituted as the power-input shaft while the parallel shaft 16 is driven therefrom by intermeshing gears 19 and 20, shown most clearly in Fig. 8. The gears 19 and 20 are arranged between the ends of the main bearing-housing 5 and the auxiliary housing 10 to provide for their dual functioning: first, to connect the two shafts 15 and 16 for rotation in opposite directions; and secondly, to provide a gear-pump for supplying lubrication to the bearings and other parts of the device. As shown in Figs. 1 and 8, the gears 19 and 20 are keyed respectively to the shafts 15 and 16 with one face of each in bearing contact with the finished end-face of the bearing-housing 10, and the opposite face thereof abutting a packing washer 22 held against the face of the main bearing-housing 5. A channeled casing-member 23 encloses the two gears 19 and 20 between the housings 5 and 10 in close contact with the periphery of their teeth. The ends of the shafts 15 and 16 are reduced in diameter to receive the inner races of the ball-bearings 12 which are held against axial displacement by means of washers 24. The two bearing-housings 5 and 10 and the member 23 are secured to the vertical wall of the housing 2 by means of bolts 25 having the heads recessed in counterbores in the wall with their shanks extending through the main housing 5 and threaded into a flange on the supplemental housing 10.

Referring particularly to Figs. 1 and 8, a pipe 30 threaded into the bottom of the housing-member 23 has its lower end located in position to take oil from the bottom of the casing 2. Communicating with the upper end of the pipe 30 is a duct 32 in the member 23 which leads upwardly to the meshing teeth of the gears 19 and 20. Arranged above the meshing teeth is an orifice 33 which opens outwardly into the enlarged bores of the bearing-housing 10. Consequently, as the gears 19 and 20 are driven in opposite directions, as indicated by the arrows in Fig. 8, oil is sucked up through the pipe 30 and discharged through the orifice 33 into the enlarged bores of the housing 10 to supply it to the bearings for the shafts 15 and 16 which are mounted in the yoke-member 11 as later described. A portion of the lubricant will also feed back to the ball bearings, previously described as located at the opposite ends of the shafts 15 and 16. Holes 34 in the upper wall of the bearing-housing 10 serve as overflow outlets for any excess oil accumulating within the bores of the housing.

The forward ends of the two shafts 15 and 16 carry twin friction wheels or disks 35 and 36 having their peripheries slightly spaced apart and in engagement with the opposite faces of a driven wheel or disk 40. The twin disks 35 and 36 are formed integral with extended hubs 37 and 38, respectively, which are mounted in needle bearings supported by the yoke-member 11, previously referred to. As shown most clearly in Fig. 6, the yoke-member 11 is of substantially U-shape having one arm 41 secured fast to a flange at the end of the housing-member 10 by means of screws 42. This arm is formed with a bore mounting the needle bearing 43 and is extended downwardly and then upwardly in a loop 44 which has a boss 45 bored to receive a needle bearing 46 for the hub 38 of the opposite disk 36. Above the boss 45 is an extension 47 of the loop 44 which is adjustably connected to an upper extension of the main arm 41 of the yoke-member 11. It will thus be observed that the main arm 41 of the yoke member 11 is held rigid by being secured to the flange at the end of the bearing-housing 10 by means of the screws 42 and suitable dowel pins 49. The upper ends of the two arms of the yoke-member 11 are connected by means of a bolt 50 inserted through a bushing 53 which is reduced at 54 to project through bores in the ends of the arms. Abutting a washer under the head of the bolt 50 is a helical spring 55 which encloses the bushing 53 and bears against the end of the free arm 47 tending to force it toward the fixed arm 41. A pair of nuts 56 on the threaded end of the bolt 50 may be set up against a washer 57 abutting the end of the arm 41 to adjust the tension of the spring 55 tending to draw the two arms together; the purpose of this arrangement being to provide means for adjusting the peripheries of the twin disks 35 and 36 in frictional contact with the faces of the driven disk 40 while compensating for wear on the parts. It thus will be observed that when power is applied to the input-shaft 15 the gears 19 and 20 will be rotated in opposite directions to cause the frictional engagement of the twin disks 35 and 36 with the disk 40 to rotate the latter in the direction indicated by the arrow in Fig. 1.

Figure 5:
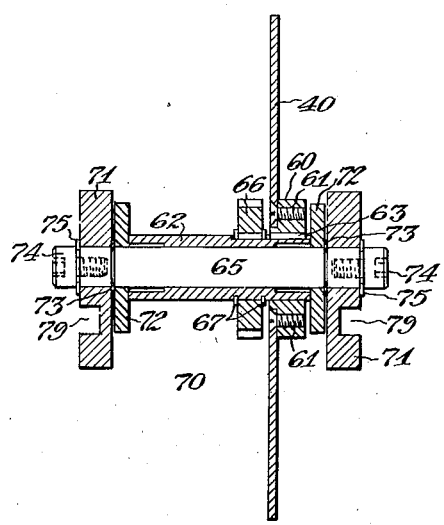
Fig. 5 is a detailed sectional view on line 5—5 of Fig. 1 showing the driven disk and the pinion connected to be driven therewith with the mounting for these parts.
Figure 7:
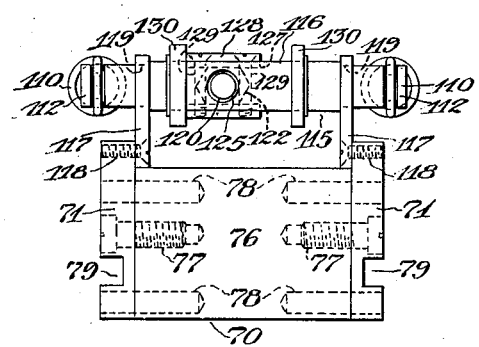
Fig. 7 is a detailed end view of the slidable carriage which mounts the driven disk and its pinion for movement relatively to the driving disks.

Referring to Fig. 5, the driven disk 40 is fastened to the side of a hub 60 by means of screws 61, the hub being keyed to a sleeve 62 at 63 with the sleeve rotatably mounted on a spindle or shaft 65. Also keyed to the sleeve 62 is a pinion-gear 66 held axially thereof by means of split spring-rings 67 engaging grooves in the periphery of the sleeve. The shaft 65 is fixedly mounted in the sides of a carriage 70 comprising opposite parallel longitudinal strips 71 tied together at their ends in a manner as later described. At the end of the carriage 70 carrying the shaft 65 a pair of links 72 abut the ends of the sleeve 62, being held thereagainst by split spring-rings 73 snapped into grooves in the periphery of the shaft 65. Screws 74 threaded into the ends of the shaft 65 with their heads abutting washers 75 are tightened thereagainst to bind the side strips 71 of the carriage 70 in connection with the shaft while maintaining them in spaced relationship. The opposite ends of the strips 71 are tied together by a transverse block or crosspiece 76, see Fig. 7, fastened thereto by screws 77 and dowel pins 78.

Figure 2:
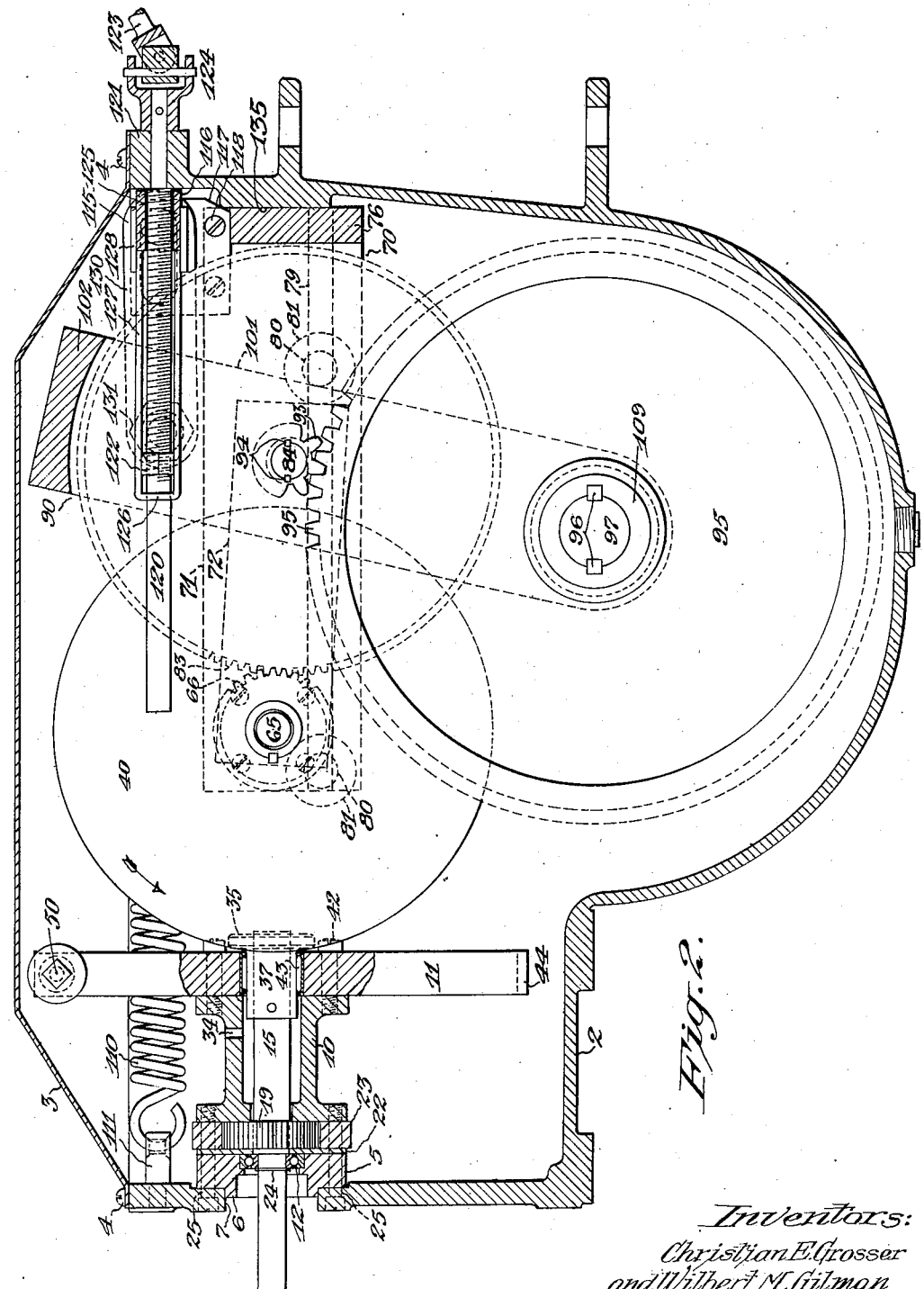
Fig. 2 is a similar elevational view, part-sectional on line 2—2 of Fig. 3.
Figure 4:
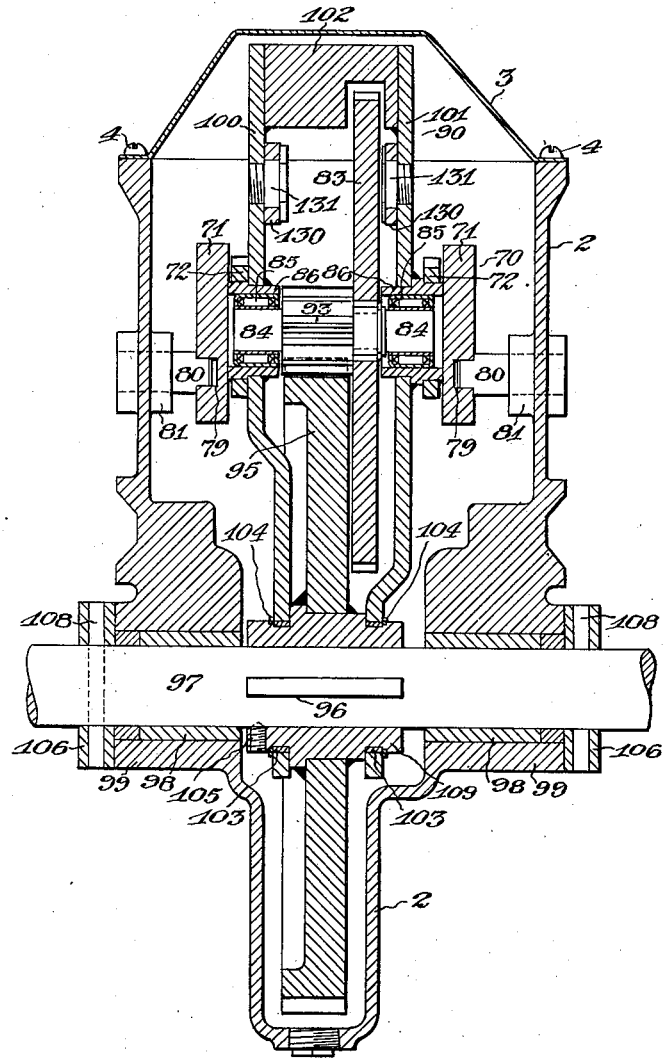
Fig. 4 is a transverse sectional view of the same on line 4—4 of Fig. 1.

The sides of the strips 71 of the carriage 70 are formed with longitudinally-extending grooves 79, see Fig. 4, engaged by the flatted ends of studs 80 projecting inwardly from the sides of the casing 2, two of these studs being arranged on each side of the casing in spaced relationship as shown in Fig. 2 to adapt the carriage to slide thereon. The studs 80 are driven through bores in bosses 81 on the side of the casing 2.

Referring particularly to Figs. 1 and 2, the pinion-gear 66 is arranged in mesh with a larger gear 83 fast on a transverse shaft 84, the ends of which are journaled in needle-bearings 85, see Fig. 4, mounted in bushings 86 which are held in bores and welded in place in the arms of a yoke-member 90.

The shaft 84 also carries a pinion-gear 93 keyed thereto at 94, see Fig. 2, and arranged in mesh with the teeth of a larger gear 95 called a bull-gear. The bull-gear 95 is keyed at 96 to the power-output shaft 97 which is journaled in bushings 98, shown in Fig. 4, held in suitable bearings 99 in the sides of the casing 2. The shaft 97 may mount the traction wheels of a vehicle such as a truck, tractor or the like, or it may be extended to carry a belt-pulley or gearing for transmitting power to a stationary machine or apparatus.

The yoke-member 90 comprises opposite parallel arms 100 and 101 connected at their upper ends by a transverse tie or crosspiece 102 welded thereto. The lower ends of the arms 100 and 101 are pivoted on a hub 109 welded to the bull-gear 95 and bored to receive the axial shaft 97. As shown in Fig. 4, the yoke 90 is adapted to rock on split bushings 103, constructed of bronze or other friction-reducing material and inserted in peripheral grooves adjacent the ends of the hub 109. A pair of split spring-rings 104 snapped into grooves at the ends of the hub 103 serve to hold the arms in abutting relation to shoulders on the hub 109. A set-screw 105 in the hub 102 has its pointed end engaging a depression in the shaft 97 to prevent axial displacement of the hub thereon. Collars 106 abutting the outer ends of the bearings 99 are secured to the shaft 97 by means of pins 108 to restrain the shaft from axial movement.

It has been stated that the transverse shaft 84 which carries the gear 83 and the pinion-gear 93 is journaled in needle-bearings 85 mounted in bushings 86 held in bores in the arms of the yoke-member 90, these bushings 86 being welded in place in the arms of the yoke-member. The bushings 86 have reduced terminal portions fitted to bores at the ends of the links 72, previously mentioned, which extend alongside the inner faces of the side plates 71 of the carriage 70. Through the means of the links 72 the shaft 84 carrying the gear 83 and pinion-gear 93 is coupled to the shaft 65 which carries the pinion-gear 66 and through this latter shaft connection is made for sliding the carriage 70. The shaft 84 is also connected to the arms 100 and 101 of the yoke 90 through the means of the bushings 86, the purpose of this arrangement being to adapt the pinion 93 to travel circumferentially of the bull-gear 95 as the yoke 90 pivots about the axis of the shaft 97. This traveling motion of the pinion 93 will slide the carriage 70 due to the connection between the two shafts 84 and 65 by means of the links 72. Consequently, any travel of the pinion 93 circumferentially of the gear 95 will cause sliding movement of the carriage 70 and thereby movement of the driven disk 40 to adjust it in a radial direction with respect to the twin driving disks 35 and 36. Stated another way, the travel of the pinion 93 around the gear 95 due to changes in torque resistance on the power-output shaft 97 will shift the driven disk 40 to vary the point of contact of the twin driving disks 35 and 36 therewith radially with respect thereto to vary the speed of the driven disk, all in the manner and for the purpose as later more fully explained.

The carriage 70 is urged to slide in a direction toward the left, as viewed in Figs. 1 and 2, by means of a pair of relatively long helical springs 110 which are anchored to studs 111 at one end of the casing 2. The springs 110 are joined at their opposite ends to studs 112 which project laterally from a transverse bar or crosshead 115 connected to the yoke-member 90. The crosshead 115, see Fig. 7, consists in a bar 116 having its central portion of rectangular cross-section with its ends reduced and formed into the cylindrical studs 112 which are inserted through plates 117 projecting vertically above the sides of the carriage 70. The plates 117 are fastened to the side members or strips 71 of the carriage 70 by means of screws 118, see Figs. 1 and 2, and have horizontal slots 119 through which the studs 112 project to adapt them for relative movement therein. Normally, the springs 110 will maintain the carriage 70 in a position such as illustrated in Fig. 1 with the twin driving disks 35 and 36 engaging the opposite faces of the driven disk 40 at a point radially inward thereon; that is, adjacent the axis of the driven disk. Means are provided for adjusting the initial position of the disk 40 relatively to the driving disks 35 and 36 comprising a stop or abutment for limiting the throw of the carriage 70.

Figure 3:
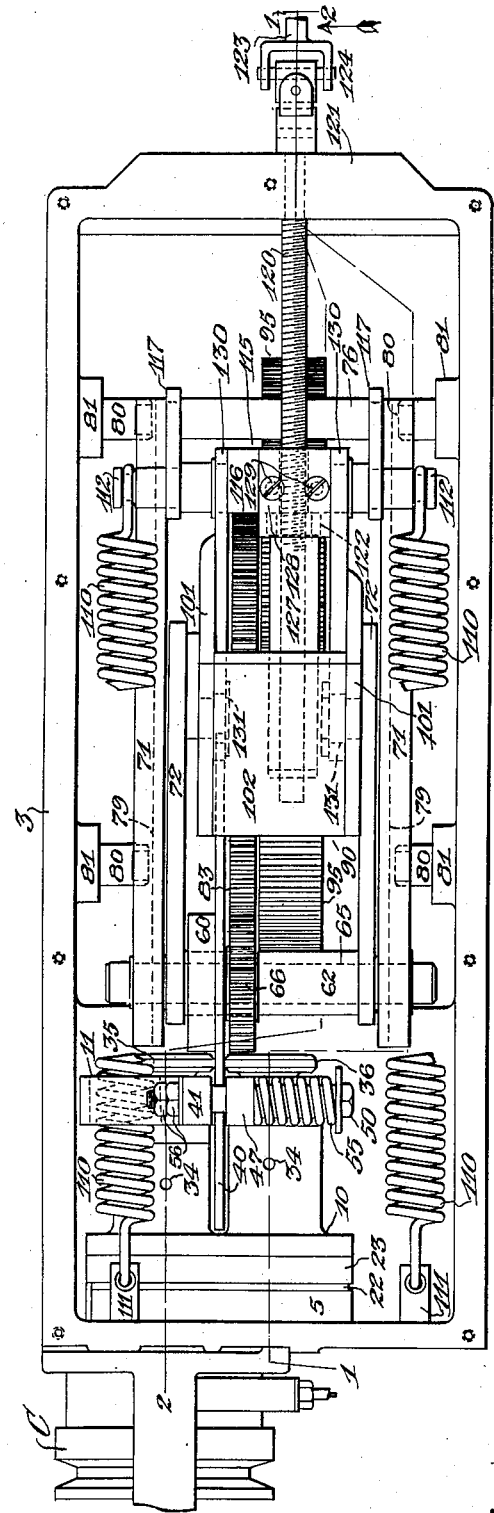
Fig. 3 is a plan view of the device shown with the cover of the casing removed.

Referring particularly to Figs. 2 and 3, the adjusting means comprise a screw-shaft 120 having its end reduced in diameter and journaled in a bearing 121 in a thickened portion of the wall of the casing 2. The screw-shaft 120 is adapted to be rotated manually for adjusting the position of an abutment or nut 122 having its interior screw-threads engaging with the threads on the screw-shaft. The screw-shaft 120 may be rotated manually through any suitable means such, for example, as an extension shaft 123 connected to its end by a universal joint, indicated generally at 124 in Figs. 1, 2 and 3. The extension shaft 123 may have a crank-lever, not herein shown, or any other suitable means, for manually rotating it at the operator's station on the vehicle. The screw-shaft 120 extends freely through a bore 125 in the crosshead 115 with its opposite unthreaded end rotatable in a bearing 126 at the end of a loop-member 127. The loop-member 127 has opposite parallel arms overlying the top and bottom of the threaded portion of the screw-shaft 120 and fastened at their ends to the sides of the crosshead 115. As shown more particularly in Fig. 7, the parallel side arms of the loop-member 127 have extensions 128 welded thereto to overlie the top and bottom of the crosshead 115, being fastened thereto by means of screws 129. The function of the loop-member 127 is to restrain the abutment or nut 122 from turning with the screw-shaft 120, the top and bottom faces of the nut being flatted to engage against the inner faces of the side arms of the loop-member as most clearly shown in Fig. 7.

The crosshead 115 is connected to the yoke-member 90 by means of a pair of links 130 engaging its cylindrical ends and similarly connected to a pair of studs 131 formed with threaded portions screwed into holes in the sides 100 and 101 of the yoke-member. As previously noted, the yoke-member 90 is connected to the carriage 70 through the means of the shaft 84. By turning the screw-shaft 120 the abutment or nut 122 may be adjusted therealong to regulate its position whereby it will act as a stop, see dotted lines in Figs. 1 and 3, to engage with the side of the crosshead 115 to limit the rocking motion of the yoke-member 90 in counter-clockwise direction, as viewed in Fig. 1, and to thereby limit the sliding motion of the carriage 70 toward the left. Through this means the device may be adjusted to position the driven disk 40 relatively to the driving disks 35 and 36 for maximum high-speed value of the drive so that when the transmission is operating without high torque resistance on the power-output shaft 97, for example, when a tractor is being driven without a load, its speed will not be excessive.

The construction and arrangement of the parts of the device having been described in detail, its method of operation is explained as follows: The screw-shaft 120 having been adjusted manually in the manner explained above to regulate the high-speed operation of the transmission; for example, with the parts in the position shown in Fig. 1 of the drawings, power is applied to the input-shaft 15 from any suitable source such as an internal combustion motor. Usually, a clutch such as indicated generally at C in Fig. 3 is provided for connecting the motor or other prime-mover with the drive-shaft 15, but such means is not herein illustrated in detail as it forms no part of the invention. The shaft 15 will drive through the gears 19 and 20 to rotate the shaft 16 in the opposite direction and these two shafts will drive the twin disks 35 and 36 to cause their frictional engagement with the driven disk 40 to rotate the latter and turn the pinion-gear 66. The pinion-gear 66, in turn, will drive through the larger gear 83 fast on the shaft 84 to cause its pinion-gear 93 to drive the bull-gear 95 and thereby rotate the power-output shaft 97. Normally, when there is a minimum of torque resistance on the power-output shaft 97 the disk 40 will remain in position with the driving disks 35 and 36 adjacent its axis under the tension of the springs 110 acting on the carriage 70, so that it will be driven at relatively high speed to drive through the gearing and transmit rotation to the power-output shaft 97 at a high rate of speed. When, however, more torque resistance is imposed on the power-output shaft 97 as, for example, when a vehicle is first started and its inertia must be overcome, or if a load is added to the machine or apparatus such as a tractor being driven by the transmission, the speed of the driven shaft 97 will be reduced and the torque output increased in value. That is to say, with added resistance to turning of the power-output shaft 97 the pinion 93 will tend to travel in clockwise direction around the circumference of the bull-gear 95. Consequently, through the connection of the shaft 84 of the pinion 93 with the shaft 65, by means of the links 72, the carriage 70 will be moved toward the right, as viewed in Fig. 1, to shift the axis of the driven disk 40 in the same direction. If the torque resistance is sufficient to overcome the tension of the springs 110 and is continued the pinion 83 may travel to the position illustrated in Fig. 2 to slide the disk 40 to a position where the driving disks 35 and 36 engage therewith at a point adjacent its periphery. At this juncture the end of the carriage 70 will bring up against a finished pad 135 on the side of the casing 2 to prevent further motion of the carriage and with the parts in this position the gearing will be driven at minimum speed with a maximum torque output delivered by the driven shaft 97. In other instances the opposing forces applied to shift the driven disk 40, that is, the torque resistance on the shaft 97 and the tension of the springs 110, may be equalized to balance each other so that the vehicle or tractor will be propelled at the maximum speed permissible by the conditions of travel; for example, the amount of grade either up or down. Variations in the torque resistance on the power-output shaft 97 will immediately be reflected in variations in the speed of the drive. As the torque resistance is reduced the pinion 83 will travel in the opposite direction or counterclockwise on the gear 95 to shift the carriage 70 toward the left, as viewed in Fig. 2, whereby to cause the disk 40 to be moved into position with the driving disks 35 and 36 acting thereon at a point nearer its axis. In this way fluctuations in the torque resistance as, for example, in driving the wheels of a tractor connected to a plow or other agricultural implement, due to resistance encountered in or on the ground, will automatically vary the speed of the driven element in inverse ratio to its torque to maintain a substantially constant power output of the prime-mover.

As the device operates in the manner explained above the gears 19 and 20 function as a pump to suck up the oil from the bottom of the casing 2 through the pipe 30 and duct 32, exhausting it through the orifice 33 to feed to the ball-bearings for the shafts 15 and 16 and through the interior of the bearing housing 10 to the needle-bearings for the disks 35 and 36. The remainder of the gearing is lubricated by the turning of the bull-gear 95 in the lower well of the casing 2 which acts to carry oil to the pinion-gears 93, 66 and larger gear 83.

It will be observed from the foregoing specification that the present improved transmission provides for automatically adjusting the speed of a driven element in inverse ratio to its torque resistance to maintain a substantially constant power output of the prime-mover. As the device operates automatically to maintain the proper ratio of speed and torque it obviates any tendency for the prime-mover to stall due to overload. It will be observed further that the device is particularly ingenious in the simplicity of the construction and arrangement of the parts and practically proof against wear and deterioration thereof due to the lubrication system. The use of a pair of driving wheels or disks peripherally engaging opposite faces of the driven disk provides for balancing the relatively high contact forces between the disks since by the use of two contact points rather than one, halving the tangential forces transmitted by the frictional contact is accomplished.

While the explanation of the automatic operation of the present improved transmission has been confined to its use for constant power application, it is equally well adapted to provide other desired characteristics between speed and torque. For example, by the use of very low constant springs for controlling the movement of the sliding carriage carrying the driven disk a characteristic could be obtained approaching constant torque rather than constant horsepower. Other desired relationships falling between the limits of constant horsepower and constant torque could also be realized by proper spring design. Consequently, the present device has many applications to use not herein specifically described.

While the device is described and illustrated herein as embodied in a preferred form of construction it is to be understood that variations may be made in the construction and arrangement of its elements without departing from the spirit or scope of the invention as expressed in the following claims. Therefore, without limiting ourselves to the exact form of construction shown and described, we claim:

1. A variable speed torque-responsive transmission comprising a driven wheel, a pair of opposed driving wheels engaging the opposite faces of the driven wheel, means for mounting the driven wheel for movement relatively of the driving wheels to adjust the position of their engagement therewith and vary the speed of the driven wheel, power-transmission means driven from the driven wheel, and means responsive to changes in the torque resistance on the power-transmission means and communicated to the driven wheel for moving said driven wheel relatively of the driving wheels to vary its speed in inverse ratio to its torque.

2. A variable speed torque-responsive transmission comprising a driven wheel, a driving wheel engaging the lateral face of the driven wheel, means for mounting the driven wheel for movement relatively of the driving wheel to adjust the position of their engagement and the speed of the driven wheel, resilient means for moving the driven wheel relatively of the driving wheel to high speed relationship, a pinion-gear rotatable by the driven wheel, a gear driven by the pinion-gear, means for mounting the pinion-gear to adapt it to travel circumferentially of the driven gear, and means connecting the pinion-gear to the driven wheel to cause its travel to move the driven wheel relatively of the driving wheel against the action of the resilient means to reduce the speed and increase the torque on the driven gear.

3. A variable speed torque-responsive transmission comprising a driven wheel, a pair of driving wheels engaging the opposite faces of the driven wheel, means for mounting the driven wheel for movement relatively to the driving wheels to adjust the position of their engagement and vary the speed of the driven wheel, a power-transmission element driven from the driven wheel, resilient means for moving the driven wheel relatively of the driving wheels to high-speed driving relationship, and means responsive to changes in the torque resistance on the power transmission element and communicated to the driven wheel for moving said driven wheel relatively of the driving wheels against the force of the resilient means whereby to reduce the speed and increase the torque of the driven wheel.

4. In a device of the type indicated, a driven disk, a driving disk in peripheral contact with the lateral face of the driven disk, resilient means for shifting the driven disk relatively of the driving disk in a direction parallel with the axis of the driving disk to cause the driving disk to engage the driven disk adjacent the axis of the latter, and torque-responsive means for shifting the driven disk relatively of the driving disk to cause the driving disk to engage the driven disk at a point remote from the axis of the driven disk.

5. In a device of the type indicated, a driven disk, a driving disk rotatable in peripheral contact with the face of the driven disk, a pinion-gear, means for driving the pinion-gear from the driven disk, a gear driven from said pinion-gear, said pinion-gear being travelable circumferentially of the driven gear, and means connecting said pinion-gear with the driven disk to cause it to shift the latter relatively of the driving disk as said pinion travels around the driven gear whereby to vary the speed of the driven gear in inverse ratio to its torque.

6. In a power-transmission device of the type indicated, a driven disk, a driving disk frictionally engaging the driven disk to rotate the latter, a pinion-gear, means for driving the pinion-gear from the driven disk, means for connecting said pinion-gear with the driven disk to shift the latter relatively of the driving disk to vary its speed, a gear driven by the pinion-gear, and resilient means for shifting the driven disk relatively of the driving disk to increase the speed of the driven disk, said pinion-gear being travelable circumferentially of the driven gear to shift the driven disk in the opposite direction to reduce its speed upon an increase in the resistance to rotation of the driven gear.

7. In a power-transmission device of the type indicated, a driven disk, a driving disk frictionally engaging the driven disk to rotate the latter, a carriage for mounting the driven disk to adapt it to be shifted relatively to the driving disk to vary the speed of the driven disk, a pinion-gear, means for driving the pinion-gear from the driven disk, a gear driven by the pinion-gear, said pinion-gear connected to the carriage to move the latter and adapted to travel circumferentially of the driven gear, and resilient means for moving the carriage to shift the driven disk to engage the driving disk therewith at a point adjacent its axis.

8. In a device of the type indicated, a power-input shaft, a driving disk on said shaft, a driven disk frictionally engaged by the driving risk, a pinion-gear, means for driving the pinion-gear from the driven disk, a gear driven by the pinion-gear, means for mounting the pinion-gear to travel circumferentially of the driven gear, means connecting the pinion-gear to the driven disk to shift said disk relatively to the driving disk to vary the speed of the driven disk, and resilient means for shifting the driven disk to cause the driving disk to engage therewith adjacent its axis to drive the driven disk at high speed.

9. In a device of the type indicated, a driven disk, a driving disk engaging the driven disk to transmit rotation thereto, a carriage for mounting the driven disk to move relatively to the driving disk to vary the speed of the driven disk, a driven gear, a pinion-gear in mesh with the driven gear and adapted to travel circumferentially thereof, means for driving the pinion-gear from the driven disk, and means for connecting the pinion-gear to the driven disk to shift said disk under variations in the torque resistance on the driven gear as the pinion-gear travels back and forth circumferentially thereof.

10. In a device of the type indicated, a power-input shaft, a friction driving disk rotated by said shaft, a driven disk engaged by the driving disk, a power-output shaft, a gear fast on said power-output shaft, a pinion-gear meshing with the gear on the power-output shaft, gearing connecting the driven disk to drive the pinion-gear, means for mounting the pinion-gear to travel circumferentially of the gear on the power-output shaft, and means for connecting said pinion-gear to the driven disk to shift said disk relatively to the driving disk under fluctuations in the torque resistance on the power-output shaft.

11. A driving disk for connection with a source of power, a driven disk in frictional engagement with the driving disk, a power-output shaft, a driven gear fast on said shaft, a pinion-gear in mesh with the driven gear on the power-output shaft, a yoke pivoted to swing about the axis of the power-output shaft, means for mounting the pinion-gear on said yoke to adapt it to travel circumferentially of the driven gear, a carriage for mounting the driven disk to move relatively to the driving disk, and means connecting the pinion-gear to the carriage to move the latter to shift the driven disk in opposite directions to vary the point of engagement of the driving disk therewith toward and away from the axis of said driven disk.

12. In a device of the type indicated, a casing, a power-input shaft journaled in said casing, a driving disk fast on said shaft, a driven disk in frictional engagement with the driving disk, a power-output shaft journaled in the casing, a driven gear fast on said shaft, a pinion-gear meshing with the driven gear, a yoke pivoted to swing about the axis of the driven gear and provided with bearings for the pinion-gear, a slidable carriage for mounting the driven disk for movement relatively to the driving disk, gearing connecting the driven disk to rotate the pinion-gear, means connecting the pinion-gear with the carriage to slide the latter, and resilient means operative on the carriage to slide the latter to shift the driven disk to cause the driving disk to engage therewith at a point adjacent the axis of said driven disk.

CHRISTIAN E. GROSSER.
WILBERT M. GILMAN.

REFERENCES CITED

The following references are of record in the file of this patent:

UNITED STATES PATENTS

| Number | Name | Date |
| --- | --- | --- |
| 751,564 | Sargent | Feb. 9, 1904 |
| 1,076,155 | Ryan | Oct. 21, 1913 |
| 1,853,866 | Kirby | Apr. 12, 1932 |
| 1,986,436 | Heinze | Jan. 1, 1935 |
| 2,186,620 | Aprea et al. | Jan. 9, 1940 |